(12) United States Patent
Fronius

(10) Patent No.: US 8,397,595 B2
(45) Date of Patent: Mar. 19, 2013

(54) DRIVE UNIT FOR A MOTOR VEHICLE

(75) Inventor: Kuno Fronius, Lauffen (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 1426 days.

(21) Appl. No.: 11/912,876

(22) PCT Filed: Mar. 15, 2006

(86) PCT No.: PCT/EP2006/002355
§ 371 (c)(1),
(2), (4) Date: Feb. 20, 2008

(87) PCT Pub. No.: WO2006/114164
PCT Pub. Date: Nov. 2, 2006

(65) Prior Publication Data
US 2012/0132022 A1 May 31, 2012

(30) Foreign Application Priority Data
Apr. 27, 2005 (DE) .......................... 10 2005 020 415

(51) Int. Cl.
*F16N 9/02* (2006.01)
(52) U.S. Cl. ........................ 74/330; 384/385; 384/397
(58) Field of Classification Search .................... 74/330, 74/333, 340; 384/385, 397
See application file for complete search history.

(56) References Cited

U.S. PATENT DOCUMENTS

| 4,287,781 | A |   | 9/1981 | Zenker |
| 4,957,195 | A |   | 9/1990 | Kano et al. |
| 5,009,116 | A | * | 4/1991 | Ordo et al. ........................ 74/331 |
| 5,263,906 | A |   | 11/1993 | Antonov |
| 5,483,850 | A |   | 1/1996 | Yamauchi |
| 5,976,049 | A |   | 11/1999 | Yoshida et al. |
| 6,463,821 | B1 | * | 10/2002 | Reed et al. ........................ 74/330 |
| 6,487,924 | B2 | * | 12/2002 | Matsufuji et al. ............... 74/331 |

(Continued)

FOREIGN PATENT DOCUMENTS

| DE | 1 625 032 | 6/1970 |
| DE | 28 41 053 C2 | 4/1980 |

(Continued)

OTHER PUBLICATIONS

Examination report in related JP 2008-508099; Issued Oct. 25, 2010.

(Continued)

*Primary Examiner* — Ha D. Ho
(74) *Attorney, Agent, or Firm* — Knobbe, Martens, Olson & Bear, LLP

(57) ABSTRACT

A drive unit comprises a clutch arrangement and a transmission which is connected to the clutch arrangement by way of a shaft arrangement. A fluid supply device is arranged radially inside the clutch arrangement and around the shaft arrangement, in order to supply the clutch arrangement with fluid. The shaft arrangement extends into the transmission. The transmission comprises a plurality of transmission components along the shaft arrangement. The components are supplied with fluid for at least one of lubrication and cooling purposes. A radial inlet duct leads from the fluid supply device into the interior of the shaft arrangement. An axial duct extends inside the shaft arrangement. At least one radial outlet duct inside the transmission leads from the axial duct to the transmission components, in order to supply these with fluid.

14 Claims, 2 Drawing Sheets

U.S. PATENT DOCUMENTS

| | | | |
|---|---|---|---|
| 7,063,195 B2 * | 6/2006 | Berhan | 192/48.8 |
| 7,644,638 B2 * | 1/2010 | Taniai | 74/335 |
| 7,845,246 B2 * | 12/2010 | Tsukada et al. | 74/330 |
| 2004/0035666 A1 | 2/2004 | Grosspietsch et al. | |

FOREIGN PATENT DOCUMENTS

| | | |
|---|---|---|
| DE | 35 08 375 A1 | 11/1985 |
| DE | 44 05 823 A1 | 9/1994 |
| DE | 198 19 385 A1 | 11/1998 |
| DE | 101 18 756 A1 | 5/2002 |
| DE | 101 11 202 A1 | 6/2002 |
| DE | 102 03 618 A1 | 2/2003 |
| DE | 10 2004 022 652 A1 | 12/2004 |
| EP | 0 450 673 A1 | 10/1991 |
| EP | 0 987 467 A2 | 3/2000 |
| JP | 61 036 519 A | 2/1986 |
| JP | 60192129 A | 7/1986 |
| JP | 2000-097297 | 4/2000 |
| JP | 2001-182761 | 7/2001 |
| WO | WO 03/012307 | 7/2002 |

OTHER PUBLICATIONS

Computer translation of JP 2001-182761, provided in examination report.

G. Lechner, et al., Qualified Abstract and Excerpt of the Textbook "Fahrzeuggetriebe" [Vehicle Transmission] 1994 Springer-Verlag.

* cited by examiner

DRIVE UNIT FOR A MOTOR VEHICLE

CROSS-REFERENCE TO RELATED APPLICATIONS

This application claims the benefit and priority to and is a U.S. National Phase of PCT International Application Number PCT/EP2006/002355, filed on Mar. 15, 2006, which claims the priority to German patent application no. DE 10 2005 020 415, filed Apr. 27, 2005. The disclosures of the above-referenced application is hereby expressly incorporated by reference in its entirety

BACKGROUND OF THE INVENTION

The invention relates to a drive unit for a motor vehicle comprising a clutch arrangement and a transmission which is connected to the clutch arrangement by way of a shaft arrangement, a fluid supply device being arranged radially inside the clutch arrangement and around the shaft arrangement, in order to supply the clutch arrangement with fluid, the shaft arrangement extending into the transmission and the transmission comprising a plurality of transmission components along the shaft arrangement, said components being supplied with fluid for lubrication purposes.

A drive unit is disclosed, for example, by DE 102 03 618 A1. This document discloses a drive unit comprising a wet dual clutch arrangement, the two clutches being nested one radially inside the other. A fluid supply device in the form of a rotary ducting arrangement, which comprises a transmission-side stator section and at least one rotor section rotating with the clutch device, is provided radially inside the two clutches. The rotary ducting arrangement serves to supply the two clutches with fluid, in order to operate the clutches hydraulically. Cooling oil is also delivered via the rotary ducting arrangement.

A further drive unit comprising two clutches is disclosed by DE 28 41 053 C2. In this case the two clutches are arranged coaxially with an auxiliary shaft and are supplied from a pressure feed device at one axial end of the auxiliary shaft. For this purpose axial ducts and radial outlet ducts pointing towards the respective clutches are provided in the auxiliary shaft.

The supply to transmission components is not addressed in these publications. In drive units of the specified type, however, the transmission is generally lubricated by way of complex ducting lines in the transmission housing.

BRIEF SUMMARY OF THE INVENTION

Against this background, the object of the present invention is to specify an improved drive unit.

This object is achieved by a drive unit for a motor vehicle, wherein a clutch arrangement and a transmission which is connected to the clutch arrangement by way of a shaft arrangement, a fluid supply device being arranged radially inside the clutch arrangement and around the shaft arrangement, in order to supply the clutch arrangement with fluid, the shaft arrangement extending into the trans-mission and the transmission comprising a plurality of transmission components along the shaft arrangement, said components being supplied with fluid for lubrication purposes, wherein a radial inlet duct leads from the fluid supply device into the interior of the shaft arrangement, wherein an axial duct extends inside the shaft arrangement, and wherein inside the transmission at least one radial outlet duct leads from the axial duct to the transmission components, in order to supply these with fluid.

The measures according to the invention mean that the task of supplying the transmission components with fluid is assumed by the fluid supply device, normally assigned exclusively to the clutch arrangement. No additional overall axial space is therefore needed in order to supply the transmission components with fluid. The hitherto unused space radially inside the fluid supply device can now be used for feeding fluid into the interior of the shaft arrangement.

The fluid supply device can generally use the same fluid for the clutch arrangement and the transmission. It is also feasible, however, for the fluid supply device to be fed with two different types of fluid, one fluid (ATF oil, for example) being fed to the clutch arrangement and another type of fluid (hypoid gear oil, for example) being fed to the transmission.

Using the same fluid supply device for the fluid supply to the clutch arrangement and for the fluid supply to the transmission saves overall space.

The object is therefore achieved in full.

It is particularly advantageous if the fluid supply device has a rotary ducting device.

It is furthermore advantageous if the radial inlet duct and the axial duct are sealed off from the surroundings.

This can serve to achieve a type of "pump effect", which is generated by the centrifugal force of the fluid and which occurs as the rotational speed increases. The fluid actually flows via the radial outlet ducts, driven outwards by this centrifugal force, so that further fluid is drawn in due to the sealing. In this way it is possible to generate a closed fluid circuit inside the transmission housing.

According to a further preferred embodiment the radial inlet duct comprises a plurality of circumferentially spaced radial bores in the shaft arrangement.

This ensures a constant fluid delivery even in the event of speed differences.

It is correspondingly advantageous if the radial outlet duct comprises a plurality of circumferentially spaced radial bores in the shaft arrangement.

It is advantageous overall if the drive unit is a dual clutch transmission, the clutch arrangement being a dual clutch arrangement and the shaft arrangement comprising an inner shaft and a hollow shaft.

Although the transmission fluid supply according to the invention is also possible in other types of transmission, such as automated shift transmission (AMG), especially if the clutch arrangement contains a wet clutch, application to a dual clutch transmission is particularly preferred.

It is furthermore advantageous here if the axial duct is formed in the inner shaft.

It is thereby possible to supply transmission components over the entire axial length of the transmission, since in dual clutch transmissions the inner shaft generally extends over the entire axial length of the transmission.

Alternatively, it is also feasible to use the space between the inner shaft and the hollow shaft as axial duct. In this case it is readily possible to supply the transmission components arranged around the hollow shaft. Furthermore, no additional sealing is necessary.

If necessary, the axial duct thus formed can then run into an axial duct in the inner shaft, that is to say in the area in which the inner shaft emerges from the hollow shaft.

In this alternative it is also possible according to the invention to supply those transmission components which are arranged in the area of the inner shaft not enclosed by the hollow shaft.

It is furthermore advantageous if the axial duct has a bore in the core of the inner shaft.

In this way the axial duct is easy to produce from a production engineering standpoint.

It is likewise preferable overall if the radial inlet duct extends through the hollow shaft to the inner shaft.

Here the radial inlet duct comprises a plurality of sections, a duct or a bore or bores in the hollow shaft on the one hand, and a duct or a bore or bores in the inner shaft on the other.

The drive unit according to the invention is advantageous particularly in high-speed applications, such as engines for sports vehicles, for example, since lubrication of the transmission components from the inside radially outwards means that even those transmission components, which under the centrifugal forces occurring at high rotational speeds could otherwise not be effectively wetted, are well lubricated. It is also possible to lubricate those transmission components that do not have a direct connection to the fluid sump, that is to say those that cannot be wetted directly from the sump.

Using a fluid supply device intended for the clutch arrangement also for the transmission furthermore obviates the need to provide separate rotary ducting at the end face of the shaft arrangement, which would take up a considerable amount of axial space.

It goes without saying that the aforementioned features still to be explained below can be used not only in the particular combination indicated, but also in other combinations or individually, without departing from the scope of the present invention.

BRIEF DESCRIPTION OF THE SEVERAL VIEWS OF THE DRAWING

Exemplary embodiments of the invention are represented in the drawing and will be explained in more detail in the following description. In the drawing.

DETAILED DESCRIPTION OF THE INVENTION

Figure 1:
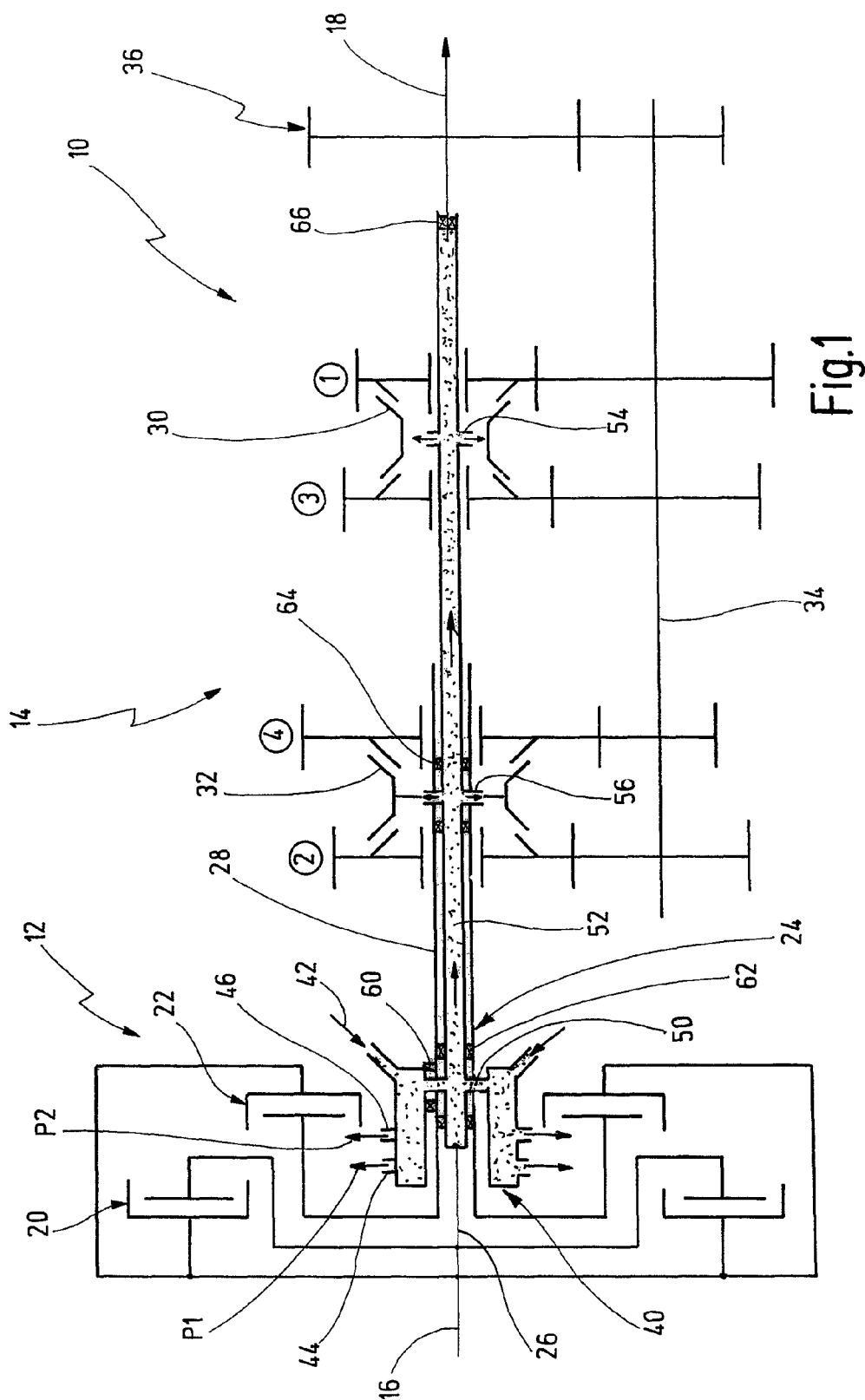
FIG. 1 shows a schematic representation of a drive unit according to a first embodiment of the present invention.

In FIG. 1 a first embodiment of a drive unit according to the invention for a motor vehicle is generally denoted by 10.

The drive unit 10 comprises a dual clutch arrangement 12 and a transmission 14 in the form of a step-variable transmission.

An input member of the dual clutch arrangement 12 is connected to an input shaft 16, which can be connected, for example, to the crankshaft of a drive engine such as an internal combustion engine.

The drive unit 10 serves to transmit power from the input shaft 16 to an output shaft 18, which in the embodiment shown is aligned coaxially with the input shaft 16.

The dual clutch arrangement 12 comprises a first clutch 20 and a second clutch 22. The clutches 20, 22 are embodied as wet clutches, in particular as wet plate clutches. Their input members are connected to the input shaft 16. An output member of the first clutch 20 is connected to an inner shaft 26 of a coaxial shaft arrangement 24. An output member of the second clutch 22 is connected to a hollow shaft 28 of the shaft arrangement 24.

The two clutches 20, 22 are nested one radially inside the other and are arranged coaxially with the shaft arrangement 24 and the input shaft 16. The first clutch 20 is hydraulically operated by a hydraulic fluid at a first clutch pressure P1. The second clutch 22 is likewise hydraulically operated, by means of a hydraulic fluid at a hydraulic pressure P2.

The clutch arrangement 12 is here represented as radially nested, merely by way of example. The two clutches 20, 22 may obviously also be arranged parallel or axially in series.

The transmission 14 is embodied as a step-variable transmission having a plurality of gear trains and assigned clutches. In FIG. 1 gear trains for the $1^{st}$, $2^{nd}$, $3^{rd}$ and $4^{th}$ gears are represented schematically (for reasons of clarity, the gear diameters are not reproduced in their correct proportions). In the transmission 14 the odd gears, the $1^{st}$ and $3^{rd}$ gears, are assigned to the first clutch 20 and to the inner shaft 26. The even gears, the $2^{nd}$ and $4^{th}$ gears, are assigned to the second clutch 22 and to the hollow shaft 28.

It will be obvious that the number of gears 1-4 is represented only as an example. The drivetrain may equally well have 5, 6, 7 or fewer or more gears.

The coaxial arrangement of the input shaft 16 and the output shaft 18 furthermore means that the overall drive unit 10 is designed for longitudinal installation in a vehicle. It will be obvious, however, that the principles according to the invention can be equally applied to transmissions for transverse installation, in particular for front transverse installation.

A first clutch assembly 30, which is supported on the inner shaft 26, is provided for the gear trains of the $1^{st}$ and $3^{rd}$ gears. A second clutch assembly 32, which is supported on the hollow shaft 28, is provided for the $2^{nd}$ and $4^{th}$ gears.

A lay shaft 34 is provided parallel to the shaft arrangement 24. The lay shaft 34 is connected to the output shaft 18 via a constant output gear train 36.

The general operating principle of a dual clutch transmission 10 is commonly known and will therefore not be described in detail. In brief, suffice it to say that through overlapping operation of the two clutches 20, 22, gear changes of successive gears can be performed without any interruption in tractive force.

The two clutches 20, 22 are in this case subjected to comparatively high stress loads since, as already stated, gear changes may take place partially under load. For this reason the clutches 20, 22 are in the present embodiment designed as wet plate clutches. Other types of wet clutches are also feasible, however.

The two clutches 20, 22 are furthermore hydraulically operated.

To supply the two clutches 20, 22 with fluid, both for the purpose of hydraulic operation and for cooling and/or lubrication purposes, a fluid supply device 40 in the form of a rotary ducting device 40, represented schematically in FIG. 1, is assigned to the dual clutch arrangement 12.

The fluid supply device 40 is arranged radially inside the dual clutch arrangement 12 and around the shaft arrangement 24.

The pressurized fluid 42 is delivered to the fluid supply device 40, generally to a stator section of the fluid supply device 40, via a connection not further denoted.

A first clutch outlet and a second clutch outlet are denoted by 44 and 46 respectively. Fluid at the pressure P1 is delivered to the first clutch 20 via the first clutch outlet 44. Fluid 42 at the pressure P2 is delivered to the second clutch 22 via the second clutch outlet 46.

The general operating principle of such fluid supply devices 40 in dual clutch arrangements is known. Yet another outlet is generally provided, which ensures the necessary cooling and/or lubrication.

The clutch outlets 44, 46 run radially outwards from the fluid supply device 40. The fluid 42 delivered is forced outwards by centrifugal forces due to the output-side rotational speeds of the fluid supply device 40. For the hydraulic actuation of the two clutches 20, 22, corresponding pressure compensating chambers may obviously be provided, which may possibly also be connected to the fluid supply device 40.

The fluid intended for cooling passes through the clutches 20, 22 from the inside radially outwards, thereby ensuring adequate cooling (and lubrication of other components).

In the case of the drive unit 10 shown in FIG. 1, the fluid supply device 40, which is provided radially inside the dual clutch arrangement 12, is also used to lubricate and/or to cool components of the transmission 14.

For this purpose a radial inlet duct 50, emerging from the fluid supply device 40 and directed radially inwards, is provided, which passes through the hollow shaft 28 and opens out in an axial duct 52 provided in the inner shaft 26.

The axial duct 52 extends substantially over the entire length of the inner shaft 26 and may take the form, for example, of a trepanned bore (core bore).

At each of the points inside the transmission 14 where lubrication and/or cooling is necessary, a radial outlet duct 54 (for the first clutch assembly 30) and a radial outlet duct 56 (for the second clutch assembly 32) is provided. In the case of the radial outlet duct 54 this only passes through the inner shaft 26 and the oil emerges radially outwards from the radial outlet duct 54 due to the centrifugal forces.

In the case of the radial outlet duct 56, this also passes through the hollow shaft 28 and the fluid emerges radially outwards for cooling and/or lubrication of the second clutch assembly 32.

The fluid delivered by way of the axial duct 52 can also be used for the cooling and/or lubrication of other components, in particular shafts, bearings etc.

Proceeding from the fluid supply device 40, suitable seals are used to create a closed circuit, which requires very little pumping action, since the fluid emerging from the radial outlet ducts 54, 56 is accelerated due to centrifugal forces and further fluid is thereby "aspirated" via the axial duct 52, so that the fluid 42 only has to be returned at relatively low pressure.

Since the fluid 42 emanating from the fluid supply device 40 first has to be forced radially inwards, however, it is generally appropriate to feed the fluid 42 at a certain minimum pressure, of 2 bar for example, in order to ensure a reliable supply of fluid to the transmission components.

The sealing of the closed fluid supply circuit for the transmission 14 comprises a first seal arrangement 60, which seals off the fluid supply device 40 from the outer circumference of the hollow shaft 28. A second seal arrangement 62 is furthermore provided, which seals off the inner shaft 26 from the hollow shaft 28, in the area of the radial inlet duct 50.

A third seal arrangement 64 is likewise provided between the inner shaft 26 and the hollow shaft 28, around the radial outlet duct 54, which passes through the hollow shaft 28.

A fourth seal arrangement 66 is in this case optionally provided, for sealing between the inner shaft 26 and the output shaft 18 carried coaxially therein.

Instead of the fourth seal arrangement, however, the axial duct 52 may also be embodied as blind duct.

Figure 2:
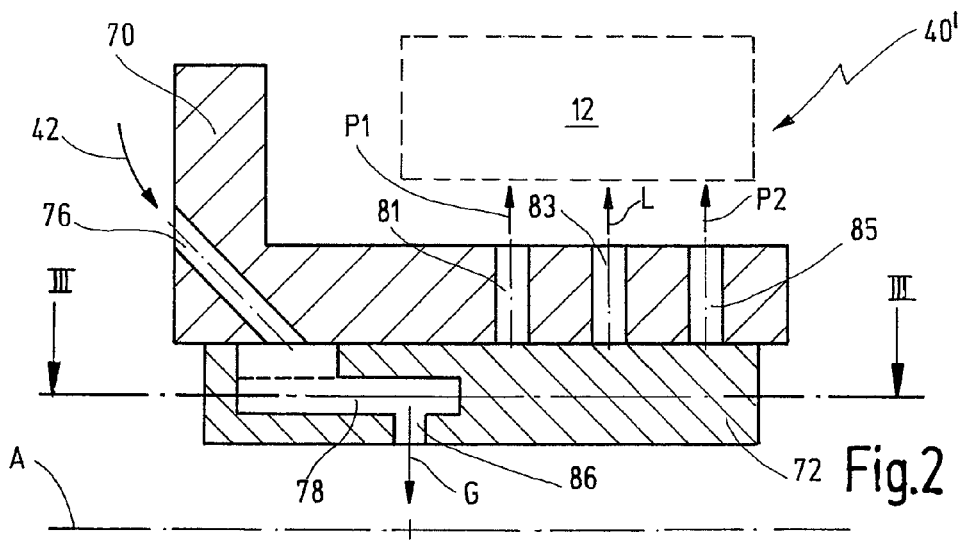
FIG. 2 shows a schematic longitudinal section through a fluid supply device for a drive unit according to the invention.

FIG. 2 shows a fluid supply device 40', which is suitable for the drive unit 10 in FIG. 1.

The fluid supply device 40' has a carrier or support 70, which is arranged as stator, that is to say it is fixedly supported in relation to a housing of the drive unit 10.

On its inner side the carrier 70 has a distributor 72, which is likewise fixed to the housing.

The distributor 72 is arranged coaxially with the carrier 70 and can be pressed into the latter, for example. This thereby simultaneously affords sealing for the hydraulic fluid to be transmitted.

The carrier 70 has a plurality of circumferentially spaced supply ducts, one of which denoted by 76 is shown in FIG. 2.

The supply duct 76 runs from an axial end face of the carrier 70 obliquely radially inwards to the inner circumference of the carrier 70.

The distributor 72 has a plurality of longitudinal ducts, one of which denoted by 78 is shown in FIG. 2.

Figure 3:
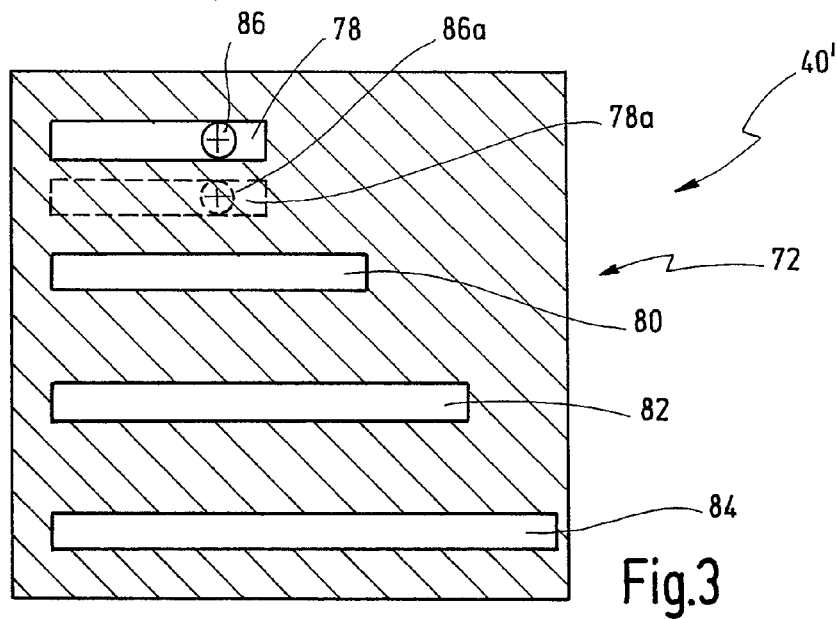
FIG. 3 shows a sectional view along the line in FIG. 2 in a developed representation.

FIG. 3 in a developed representation shows a cross-sectional view along the line III-III in FIG. 2.

It will be seen that the multiple longitudinal ducts, each carrying fluid generally at an already suitably preset pressure, are circumferentially spaced corresponding to the supply ducts 76.

The first longitudinal duct 78 serves to supply the transmission 14, as is further explained below.

A second longitudinal duct 80 is provided in the distributor 72 for the connection to a first radial duct 81 in the carrier 70. The first radial duct 81 carries fluid at a pressure P1 for the dual clutch arrangement 12.

A third longitudinal duct 82 correspondingly serves for the connection to a radial duct 83 in the carrier 70. The radial duct 83 carries cooling and/or lubricating fluid radially outwards to the dual clutch arrangement 12, as is shown schematically at L.

A fourth longitudinal duct 84 serves for the connection to a further radial duct 85 in the carrier 70, via which fluid at a pressure P2 is delivered to the dual clutch arrangement 12.

The radial ducts 81, 83, 85 lead radially outwards. The fluid supply device 40' naturally comprises a radially outer rotor (not shown), which is connected to the dual clutch arrangement 12 and is therefore part of the rotary ducting device.

It will furthermore be obvious that the representation with one longitudinal duct 80, 82, 84 and in each case one radial duct 81, 83, 85 per basic function is done for reasons of clarity. Instead of one duct 80, for example, more such longitudinal ducts can obviously also be provided, together with a corresponding number of associated radial ducts 81.

In the context of the present application the term "duct" is to be interpreted broadly. A duct may therefore consist of a single duct or a plurality of ducts.

For the purpose of supplying the transmission 14 with fluid, a radial duct 86 directed radially inwards, which is connected to the longitudinal duct 78 and forms a part of the radial inlet duct 50, is provided on the distributor 72.

The shaft arrangement 24 (rotatable about an axis A) is preferably arranged radially inside the distributor 72, and the radial duct 86 is consequently connected through the hollow shaft 28 to the axial duct 52 in the inner shaft 26.

FIG. 3 shows that, as mentioned above, a plurality of longitudinal ducts 78, 78a, with a corresponding number of radial ducts 86, 86a, can be provided instead of just one longitudinal duct 78.

To sum up, in the case of the fluid supply device 40' fluid at the pressure P1 is delivered via a supply duct 76, the longitudinal duct 80 and the radial duct 81. Fluid at the pressure P2 is delivered via a further supply duct 76, the longitudinal duct 84 and the radial duct 85.

Lubricating and/or cooling fluid L is delivered via a further supply duct 76, the longitudinal duct 80 and the radial duct 83.

Fluid for supplying the transmission is delivered via the supply duct 76 shown, the longitudinal duct 78 and the radial duct 86 directed radially inwards.

Figure 4:
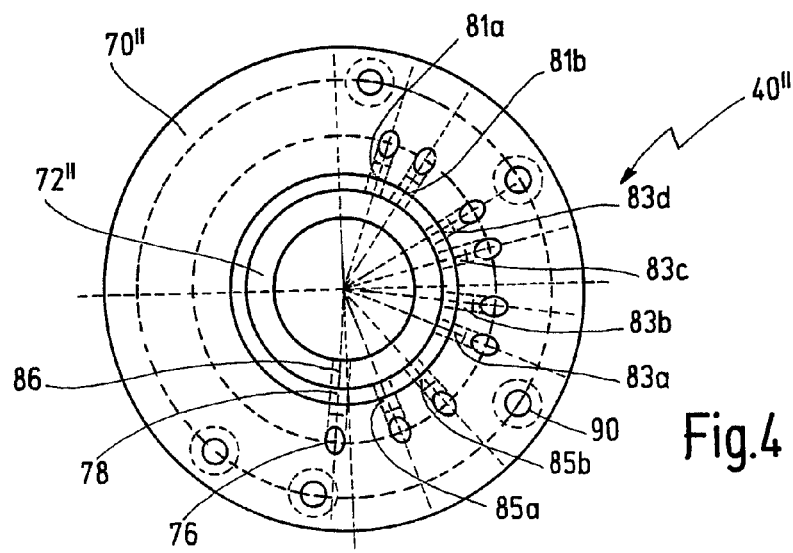
FIG. 4 shows an axial view of a fluid supply device in a further alternative embodiment of a drive unit according to the invention.

FIG. 4 shows a further alternative embodiment of a fluid supply device 40". In terms of its general construction, the fluid supply device 40" corresponds to the fluid supply device 40' in FIGS. 2 and 3, and represents a view in an axial direction (from left to right in FIG. 2).

The carrier 70", circular in axial view, and the distributor 72" arranged radially inside this and concentric therewith, can be seen.

Also shown are multiple, circumferentially spaced supply ducts, one of which denoted by 76 is shown in FIG. 4.

The supply duct denoted by 76 is connected via the longitudinal duct 78—represented by dashed lines—to the duct 86 directed radially inwards.

It is also shown that two radial ducts 81*a*, 81*b* directed radially outwards are provided, via which the fluid is provided at the pressure P1.

Two radial ducts 85*a*, 85*b* are correspondingly provided, in order to deliver fluid at the pressure P2.

Finally, four radial ducts 83*a*-83*d* are provided in order to deliver lubricating and/or cooling fluid.

It will be appreciated that in the case of the fluid supply device 40" more than one fluid delivery duct is provided for each of the basic functions of the dual clutch arrangement 12. For supplying the transmission, only one common duct is provided.

The axial ducts assigned to the radial ducts may correspondingly be separate individual ducts, although they can also be combined to form distribution ducts, which are then wider than the individual radial ducts.

What is claimed is:

1. A drive unit comprising a clutch arrangement and a transmission, which is connected to the clutch arrangement by way of a shaft arrangement, a fluid supply device being arranged radially inside the clutch arrangement and around the shaft arrangement, in order to supply the clutch arrangement with fluid, the shaft arrangement extending into the transmission and the transmission comprising a plurality of transmission components along the shaft arrangement, said components being supplied with fluid for at least one of lubrication and cooling purposes, wherein a radial inlet duct leads from the fluid supply device into the interior of the shaft arrangement, wherein an axial duct extends inside the shaft arrangement, and wherein inside the transmission at least one radial outlet duct leads from the axial duct to the transmission components, in order to supply these with fluid.

2. The drive unit as claimed in claim 1, wherein the fluid supply device comprises a rotary ducting device.

3. The drive unit as claimed in claim 1, wherein the radial inlet duct and the axial duct are sealed off from the surroundings.

4. The drive unit as claimed in claim 1, wherein the radial inlet duct comprises a plurality of circumferentially spaced radial bores in the shaft arrangement.

5. The drive unit as claimed in claim 1, wherein the radial outlet duct comprises a plurality of circumferentially spaced radial bores in the shaft arrangement.

6. The drive unit as claimed in claim 1, wherein the drive unit is a dual clutch transmission, wherein the clutch arrangement is a dual clutch arrangement and wherein the shaft arrangement comprises an inner shaft and a hollow shaft.

7. The drive unit as claimed in claim 6, wherein the axial duct is formed in the inner shaft.

8. The drive unit as claimed in claim 7, wherein the axial duct comprises a bore in the core of the inner shaft.

9. The drive unit as claimed in claim 6, wherein radial inlet duct extends through the hollow shaft to the inner shaft.

10. A dual clutch transmission comprising a dual clutch arrangement and a step-variable transmission which is connected to the dual clutch arrangement by way of a shaft arrangement, a fluid supply device being arranged radially inside the clutch arrangement and around the shaft arrangement, in order to supply the clutch arrangement with fluid, the shaft arrangement extending into the transmission and the transmission comprising a plurality of transmission components along the shaft arrangement, said components being supplied with fluid for at least one of lubrication and cooling purposes, wherein a radial inlet duct leads from the fluid supply device into the interior of the shaft arrangement, wherein an axial duct extends inside the shaft arrangement, and wherein inside the transmission at least one radial outlet duct leads from the axial duct to the transmission components, in order to supply these with fluid.

11. The dual clutch transmission as claimed in claim 10, wherein the fluid supply device comprises a rotary ducting device.

12. The drive unit as claimed in claim 10, wherein the shaft arrangement comprises an inner shaft and a hollow shaft, and wherein the axial duct is formed in the inner shaft.

13. The drive unit as claimed in claim 12, wherein the axial duct comprises a bore in the core of the inner shaft.

14. The drive unit as claimed in claim 10, wherein the shaft arrangement comprises an inner shaft and a hollow shaft, and wherein the radial inlet duct extends through the hollow shaft to the inner shaft.

* * * * *